United States Patent
Tsuji et al.

(10) Patent No.: US 9,568,300 B2
(45) Date of Patent: Feb. 14, 2017

(54) INDUCTION TYPE POSITION MEASURING APPARATUS

(71) Applicant: MITUTOYO CORPORATION, Kawasaki, Kanagawa (JP)

(72) Inventors: Shozaburo Tsuji, Kanagawa (JP); Fujio Maeda, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 57 days.

(21) Appl. No.: 14/609,791

(22) Filed: Jan. 30, 2015

(65) Prior Publication Data

US 2015/0219434 A1    Aug. 6, 2015

(30) Foreign Application Priority Data

Feb. 4, 2014    (JP) ................................. 2014-019406

(51) Int. Cl.

| G01B 7/14 | (2006.01) |
|---|---|
| G01B 7/00 | (2006.01) |
| G01D 5/20 | (2006.01) |
| G01B 1/00 | (2006.01) |
| G01D 1/00 | (2006.01) |

(52) U.S. Cl.
CPC ................. *G01B 7/14* (2013.01); *G01B 7/003* (2013.01); *G01D 5/202* (2013.01); *G01B 1/00* (2013.01); *G01B 2210/00* (2013.01); *G01D 1/00* (2013.01)

(58) Field of Classification Search
CPC .......... G01B 1/00; G01B 2210/00; G01D 1/00
See application file for complete search history.

(56) References Cited

U.S. PATENT DOCUMENTS

| 5,233,294 A * | 8/1993 | Dreoni ................... G01B 7/003 324/207.16 |
| 5,412,317 A * | 5/1995 | Kyoizumi .............. G01B 7/003 324/207.13 |
| 6,259,249 B1 | 7/2001 | Miyata |
| 6,545,461 B1 * | 4/2003 | Miyata ................. G01D 5/2053 324/207.17 |
| 6,646,433 B2 | 11/2003 | Milvich |
| 2002/0030484 A1 * | 3/2002 | Kiriyama ................. G01D 3/08 324/207.17 |
| 2006/0001518 A1 * | 1/2006 | Hayashi ............... G01D 5/2046 336/200 |
| 2012/0098472 A1 * | 4/2012 | Wrobel ..................... H02P 1/28 318/400.11 |

FOREIGN PATENT DOCUMENTS

| JP | 11-223505 | 8/1999 |
| JP | 2004-003975 | 1/2004 |

* cited by examiner

*Primary Examiner* — Jermele M Hollington
*Assistant Examiner* — Temilade Rhodes-Vivour
(74) *Attorney, Agent, or Firm* — Rankin, Hill & Clark LLP

(57) ABSTRACT

An induction type position measuring apparatus includes a scale and a sensor. The scale includes a track having a plurality of control patterns provided at equal intervals along a measurement reference line to control flow of an induced current, and a first edge portion and a second edge portion located on both sides of the measurement reference line. The sensor is provided to be capable of moving relatively to the scale along the measurement reference line to detect an induced current. The scale includes regulation patterns at least between the track and the first edge portion or between the track and the second edge portion to regulate a flow of an induced current.

8 Claims, 10 Drawing Sheets

INDUCTION TYPE POSITION MEASURING APPARATUS

CROSS-REFERENCE TO RELATED APPLICATION

This non-provisional application claims priority under 35 U.S.C. §119(a) from Japanese Patent Application No. 2014-019406, filed on Feb. 4, 2014, the entire contents of which are incorporated herein by reference.

BACKGROUND OF THE INVENTION

Field of the Invention

The present invention relates to an induction type position measuring apparatus which measures a position by utilizing an induced current.

Description of the Related Art

An induction type position measuring apparatus which detects an induced current generated by electromagnetic induction and measures the position is applied to linear encoders, rotary encoders, and so forth which measure a position with high precision. The induction type position measuring apparatus has a merit that position measurement can be conducted with high precision even in a dust environment and the structure can be simplified, as compared with an optical position measuring apparatus.

The induction type position measuring apparatus includes a sensor and a scale disposed to be relatively movable along a measurement reference line. A pattern which plays a role of a coil is formed on the scale. The induction type position measuring apparatus detects an induced current which flows through the pattern on the scale by using the sensor, and performs arithmetic operation to obtain the position of the sensor relative to the scale on the basis of a detected signal.

JP 11-223505 A discloses an induction type position measuring apparatus in which periodically disposed conductor closed loops are provided on the scale and an induced current flowing through the conductor closed loops is detected by a detection wire in the sensor. Furthermore, JP 2004-003975 A discloses an induction type position measuring apparatus in which openings are provided through the scale and a position is detected by sensing an induced current flowing around the opening with the sensor. For providing the openings through the scale, a portion of a basic material which is a conductive plate material is periodically punched or removed by etching.

FIG. 10A and FIG. 10B are schematic plane views exemplifying a conventional scale. A scale 2H including one row of tracks T is exemplified in FIG. 10A. A scale 2I including three rows of tracks T1 to T3 is exemplified in FIG. 10B. By the way, in the present specification, an axis parallel to a measurement reference line ML is referred to as X axis. An axis perpendicular to the X axis and parallel to a main surface of the scale is referred to as Y axis. An axis perpendicular to the X axis and the Y axis is referred to as Z axis.

On the track T of the scale 2H illustrated in FIG. 10A, a plurality of control patterns 21 are provided at equal intervals in a direction along the X axis. In a case where a shape on a first edge portion 251 side of the control pattern 21 is different from a shape on a second edge portion 252 side of the control pattern as in the scale 2H, a route difference occurs between induced currents i1 and i1' flowing around the control pattern 21.

Furthermore, in the scale 2I illustrated in FIG. 10B, the plurality of tracks T1 to T3 are provided in parallel. A plurality of control patterns 211 are provided on the track T1 at a period $\lambda 1$ in a direction along the X axis. A plurality of control patterns 212 are provided on the track T2 at a period $\lambda 2$ in a direction along the X axis. A plurality of control patterns 213 are provided on the track T3 at a period $\lambda 3$ in a direction along the X axis. The periods $\lambda 1$, $\lambda 2$ and $\lambda 3$ are different from each other.

In the scale 2I, for example, an induced current i1 flowing along the control pattern 211 on the track T1 distributes mainly around the control pattern 211 which becomes the shortest route. However, the induced current flows freely through the whole of the scale 2I. Therefore, a portion of the induced current i1 flows around the control pattern 212 on the adjacent track T2 (see induced current i2).

In the case where the scales 2H and 2I with openings provided are used as illustrated in FIGS. 10A and 10B, an induced current generated on the scale can freely through the whole region of the scale. If there is an uneven portion such as a concave shape or a convex shape on an end face on the first edge portion 251 side as in the scale 2H illustrated in FIG. 10A, the routes of the induced current i1 and i1' are influenced. Unless an induced current flows stably for each of control pattern 21, an error occurs in detection conducted by the sensor, resulting in a problem in that high precision position measurement is obstructed.

Furthermore, in the scale 2I illustrated in FIG. 10B, a magnetic field with the period $\lambda 2$ of the control pattern 212 on the track T2 is generated by the induced current i2 branched from the induced current i1, and characteristics of the position measurement is influenced.

In the case where the plurality of tracks T1 to T3 are provided in parallel as on the scale 2I, it is desirable in principle to cause the tracks T1 to T3 to be respectively independent and insulate the tracks T1 to T3 completely. In this case, however, it is necessary to manufacture a plurality of scales respectively corresponding to the tracks T1 to T3 and stick the scales together on an insulative supporting substrate. This results in a problem in that a quality degradation is caused by position deviation at the time of sticking together and the cost is increased.

SUMMARY OF THE INVENTION

An object of the present invention is to provide an induction type position measuring apparatus capable of detecting an induced current flowing through the scale on which a periodic pattern is formed and capable of conducting position measurement with high precision.

An induction type position measuring apparatus according to the present invention includes a scale and a sensor. The scale includes a track having a plurality of control patterns provided at equal intervals along a measurement reference line to control the flow of an induced current, and a first edge portion and a second edge portion located on both sides of the measurement reference line. The sensor is provided to be capable of moving relatively to the scale along the measurement reference line to detect an induced current. The scale includes regulation patterns at least between the track and the first edge portion or between the track and the second edge portion to regulate the flow of an induced current.

According to such a configuration, the regulation patterns are provided. As a result, it is possible to introduce an induced current which attempts to flow freely into a space between the control pattern and the regulation pattern and stabilize a route of flow of the induced current. Accordingly, the flow of induced currents respectively for the plurality of control patterns is made uniform. In other words, owing to provision of such regulation patterns, the way of flow of the induced current becomes less influenced by a shape of an edge portion of the scale, and a stable induced current is generated every plurality of control patterns. As a result, it becomes possible to conduct position detection with high precision.

In the induction type position measuring apparatus according to the present invention, it is desirable that the regulation patterns are provided both between the track and the first edge portion and between the track and the second edge portion.

According to such a configuration, a route of the flow of an induced current controlled by the control pattern is stabilized on both sides of the scale, i.e., the first edge portion side and the second edge portion side. As a result, the way of flow of the induced current becomes less influenced by shapes of both the first edge portion and the second edge portion of the scale. Accordingly, it becomes possible to conduct position detection with high precision.

In the induction type position measuring apparatus according to the present invention, it is desirable that a period of a plurality of regulation patterns is equal to a period of the plurality of control patterns.

According to such a configuration, the period of the induced current generated by the plurality of control patterns is not disturbed by the period of the plurality of regulation patterns. As a result, uniformalizing of regulation on the induced current brought about by the regulation patterns is achieved.

In the induction type position measuring apparatus according to the present invention, it is desirable that the track includes a first track including a plurality of first control patterns provided with a first period along the measurement reference line, and a second track provided in parallel to the first track and including a plurality of second control patterns provided with a second period different from the first period along the measurement reference line, and the regulation patterns are provided at least between the first track and the first edge portion, between the first track and the second track, or between the second track and the second edge portion.

According to such a configuration, a route of an induced current in each track in a scale including a plurality of tracks is stabilized by the regulation patterns. As a result, the way of flow of the induced current becomes less influenced by the edge portions of the scale or the patterns on an adjacent track. Therefore, a stable induced current is generated every plurality of control patterns, and it becomes possible to detect a position of the sensor relative to the scale with high precision.

In the induction type position measuring apparatus according to the present invention, it is desirable that the induction type position measuring apparatus is an induction type position measuring apparatus of absolute form which finds an absolute position of the sensor relative to the measurement reference line on the basis of a detection result of the induced current on the first track and a detection result of the induced current on the second track, the regulation patterns include intermediate regulation patterns provided between the first track and the second track, and a period of a plurality of the intermediate regulation patterns is equal to a period of control patterns on the first track or the second track that exerts greater influence upon resolution of position detection.

According to such a configuration, the route of flow of an induced current on at least one of the first track and the second track is stabilized by the intermediate regulation patterns provided between the first track and the second track. Furthermore, since the period of the plurality of intermediate regulation patterns is equal to the period of the control patterns on a track that exerts greater influence on the resolution in position detection, it becomes possible to prevent the reduced resolution in measurement of the absolute position.

DETAILED DESCRIPTION OF THE EMBODIMENTS

Hereafter, embodiments of the present invention will be described with reference to the drawings. By the way, in the specification and the drawings of the present application, elements similar to those described earlier with reference to the drawings are denoted by like characters, and detailed description thereof will be omitted suitably.

(First Embodiment)

Figure 1:
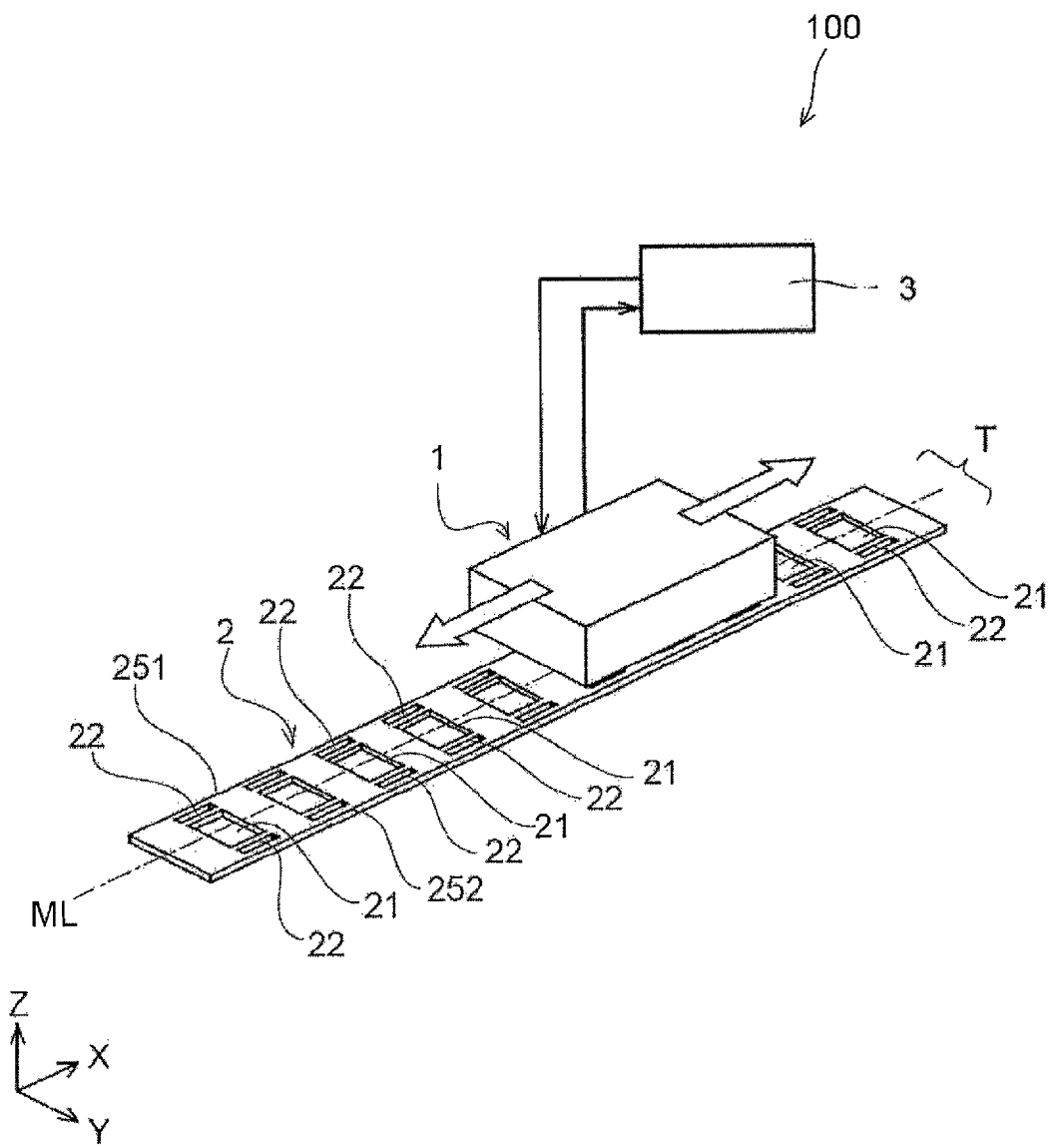
FIG. 1 is a schematic oblique view exemplifying a configuration of an induction type position measuring apparatus according to an embodiment.

FIG. 1 is a schematic oblique view exemplifying a configuration of an induction type position measuring apparatus according to the present embodiment.

Figure 2A:
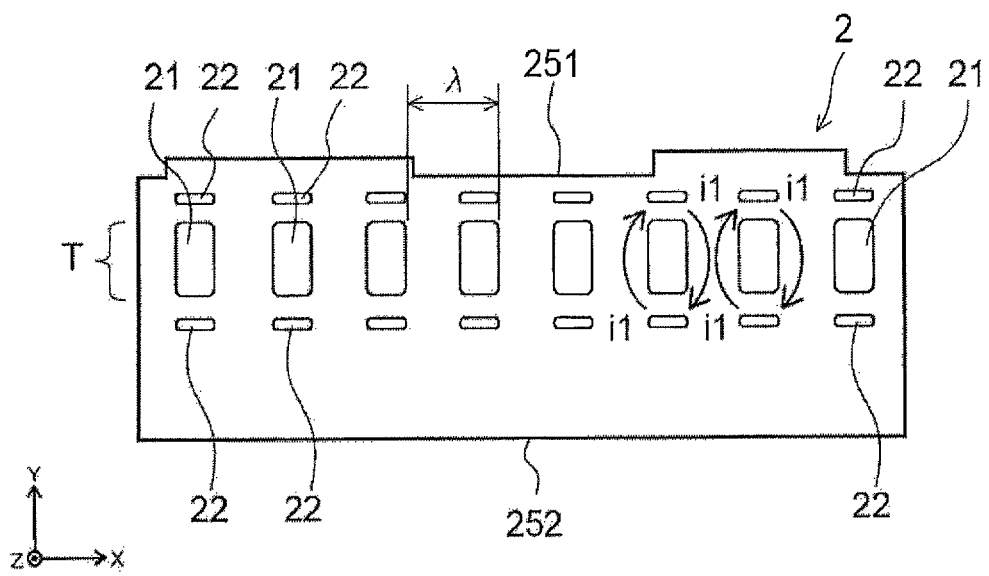
FIGS. 2A and 2B are schematic plane views exemplifying a scale applied in the embodiment.
Figure 2B:
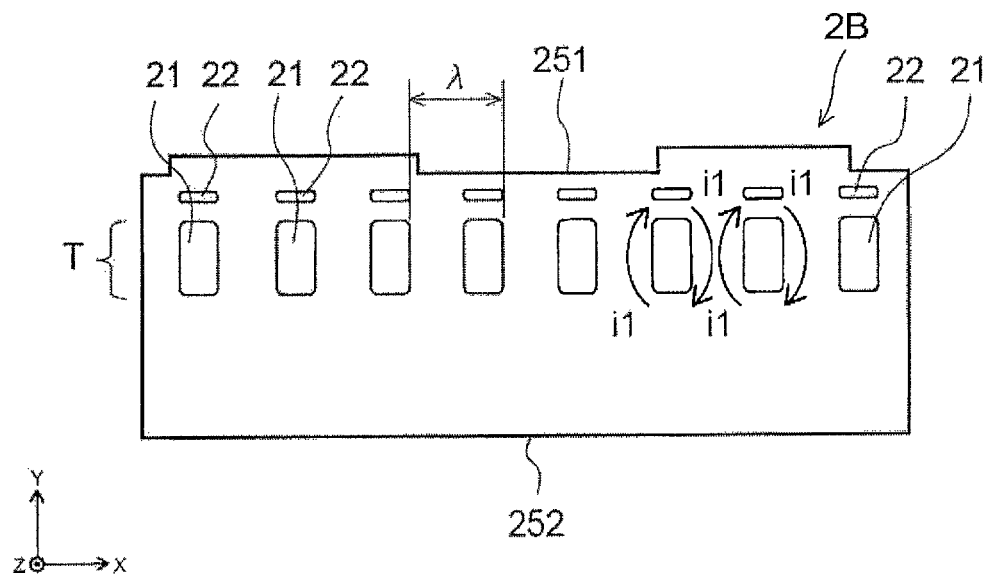

FIGS. 2A and 2B are schematic plane views exemplifying a scale applied in the embodiment.

As illustrated in FIG. 1, an induction type position measuring apparatus 100 includes a sensor 1 and a scale 2. The scale 2 includes a track T which extends along a measurement reference line ML, and the first edge portion 251 and the second edge portion 252 located on both sides of the measurement reference line ML.

In a case of the elongate scale 2 that extends in a direction parallel to the X axis, the first edge portion 251 and the second edge portion 252 are portions including side faces extending in the lengthwise direction. The track T is provided between the first edge portion 251 and the second edge portion 252.

In the induction type position measuring apparatus 100 using the induced currents, the scale 2 is formed by working (for example, punching or etching) a conductive plate material. As the conductive plate material, for example, copper or stainless steel is used. In this case, mechanical strength of the scale 2 is maintained by the conductive plate material itself.

A plurality of control patterns 21 are provided on the track T of the scale 2. The plurality of control patterns 21 are provided at equal intervals along the measurement reference line ML. The control patterns 21 are patterns used to control the flow of induced currents flowing through the scale 2. The control patterns 21 are, for example, hole patterns. In a case where the control patterns 21 are hole patterns, an induced current flows through periphery of the hole of the control pattern 21. By the way, the control pattern 21 may be a low resistance pattern. The low resistance pattern is a pattern in which electric resistance of a portion of the control pattern 21 is low as compared with other portions. In a case where the control pattern 21 is the low resistance pattern, an induced current flows within the control pattern 21.

The sensor 1 is provided to be capable of moving along the measurement reference line ML relatively to the scale 2. A detection unit (not illustrated) which detects an induced current flowing through the scale 2 and a drive coil (not illustrated) which lets an AC current flow are provided in the sensor 1. An induced current coupled to a varying magnetic field generated by the drive coil flows along the control pattern 21 opposed to the sensor 1. The detection unit in the sensor 1 detects an induced current which flows along the control pattern 21 opposed to the sensor 1.

A control unit 3 is connected to the sensor 1. The control unit 3 supplies an AC current to the drive coil in the sensor 1. In addition, the control unit 3 receives a signal based upon an induced current detected by the detection unit in the sensor 1, and performs an arithmetic operation to obtain a position of the sensor 1 relative to the measurement reference line ML.

The induction type position measuring apparatus 100 detects the position of the sensor 1 relative to the scale 2 on the basis of information of the induced current detected by the sensor 1. In other words, the sensor 1 passes over the plurality of control patterns 21 arranged at equal intervals, in order, and consequently magnitude of the induced current detected by the sensor 1 changes periodically. The control unit 3 can perform arithmetic operation to obtain the position of the sensor 1 relative to the measurement reference line ML, on the basis of the periodic change of a detection signal of the induced current which is output from the sensor 1.

In the induction type position measuring apparatus 100 according to the present embodiment, regulation patterns 22 are provided on the scale 2. The regulation patterns 22 are provided on both sides, i.e., between the track T and the first edge portion 251 and between the track T and the second edge portion 252. The regulation patterns 22 are patterns which regulate the way of flow of induced currents flowing through the scale 2.

As illustrated in FIG. 2A, the regulation patterns 22 provided on the scale 2 are, for example, hole patterns. An area of each regulation pattern 22 viewed in a direction parallel to the Z axis is smaller than an area of each control pattern 21 viewed in a direction parallel to the Z axis. Since such regulation patterns 22 are provided, the way of flow of the induced current i1 flowing around each control pattern 21 is regulated. In other words, it becomes difficult for portions of the induced current i1 flowing around the control pattern 21 that attempt to flow in the directions of the first edge portion 251 and the second edge portion 252 to flow outside the regulation pattern 22. As a result, the induced current i1 flows to be introduced between the control pattern 21 and the regulation pattern 22. Accordingly, the way of flow of the induced current i1 depending upon each control pattern 21 is stabilized.

It is desirable that the regulation pattern 22 is provided to correspond to each of the plurality of control patterns 21. In addition, it is desirable that the plurality of regulation patterns 22 are provided with the same period as the period λ of the plurality of control patterns 21 parallel to the X axis. As a result, a period of magnetic field distribution generated by the regulation patterns 22 coincides with a period of magnetic field distribution generated by the control patterns 21, and uniformalizing of the magnetic field distribution is achieved. As a result, precision of the detection of the induced current i1 conducted by the sensor 1 is improved.

By the way, it is desirable to make a space between the control pattern 21 and the regulation pattern 22 on the first edge portion 251 side equal to a space between the control pattern 21 and the regulation pattern 22 on the second edge portion 252 side. As a result, further uniformalizing of magnetic field distribution is achieved on the first edge portion 251 side and on the second edge portion 252 side of the control pattern 21.

Even if there is a non-uniform portion such as a concave shape or a convex shape on an end face on the first edge portion 251, the route of the induced current i1 becomes less influenced by the shape of the first edge portion 251 by using the scale 2 with such regulation patterns 22 provided.

In addition, in the scale 2, the regulation patterns 22 are provided on the second edge portion 252 side as well of the control pattern 21. Even in a case where the shape of the control pattern 21 on the first edge portion 251 side is different from the shape of the control pattern 21 on the second edge portion 252 side, a difference between routes of the induced current i1 flowing around the control pattern 21 is suppressed. As a result, the magnetic field distribution generated by the control pattern 21 is made uniform between the first edge portion 251 side and the second edge portion 252 side, and consequently the precision of detection of the induced current i1 conducted by the sensor 1 is improved.

(Modification of First Embodiment)

A scale 2B applied to a modification of the present embodiment is illustrated in FIG. 2B. In the scale 2B, regulation patterns 22 are provided between the track T and the first edge portion 251. The regulation patterns 22 are not provided between the track T and the second edge portion 252.

In the scale 2B, the regulation patterns 22 are provided between the track T and the first edge portion 251 in this way. Even if there is a non-uniform portion such as a concave shape or a convex shape on an end face on the first edge portion 251 side, the route of the induced current i1 becomes less influenced by the shape of the first edge portion 251 side, because the route of the induced current i1 is intercepted by the regulation pattern 22.

In the scale 2B as well, it is desirable that the regulation pattern 22 is provided between each of the plurality of control patterns 21 and the first edge portion 251 in the same way as the scale 2 illustrated in FIG. 2A. In addition, it is desirable that the plurality of regulation patterns 22 are provided with the same period as the period λ of the plurality of control patterns 21 parallel to the X axis. As a result, the period of magnetic field distribution generated by the regulation patterns 22 coincides with the period of magnetic field distribution generated by the control patterns 21, and consequently uniformalizing of the magnetic field distribution is achieved. As a result, precision of the detection of the induced current i1 conducted by the sensor 1 is improved.

By the way, in the scale 2B according to the modification, it suffices to provide the regulation patterns 22 either between the track T and the first edge portion 251 or between the track T and the second edge portion 252. In other words, although not illustrated, a configuration in which the regulation patterns 22 are provided between the track T and the second edge portion 252 and the regulation patterns 22 are not provided between the track T and the first edge portion 251 may be used. Even if there is a non-uniform portion such as a concave shape or a convex shape on an end face on the second edge portion 252 side in this case, the route of the induced current i1 becomes less influenced by the shape of the second edge portion 252 side, because the route of the induced current i1 is intercepted by the regulation pattern 22.

FIGS. 3A to 3D are schematic plane views exemplifying the shape and position of the regulation pattern. In any of FIGS. 3A to 3D, a relation between one control pattern 21 and one regulation pattern 22 is exemplified. However, the same is true of relations between other control patterns 21 and other regulation patterns 22.

Figure 3A:
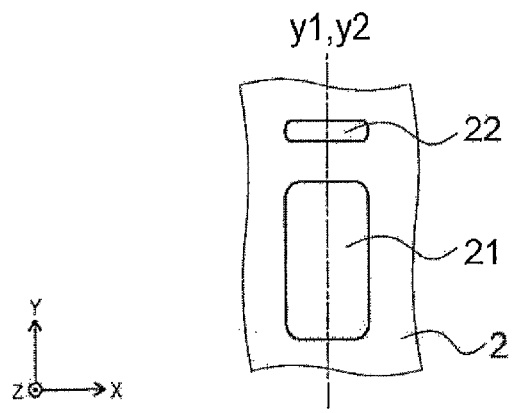
FIGS. 3A to 3D are schematic plane views exemplifying a shape and a position of a regulation pattern.
Figure 3B:
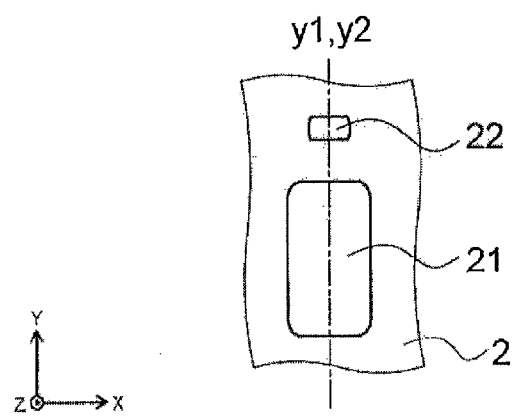
Figure 3C:
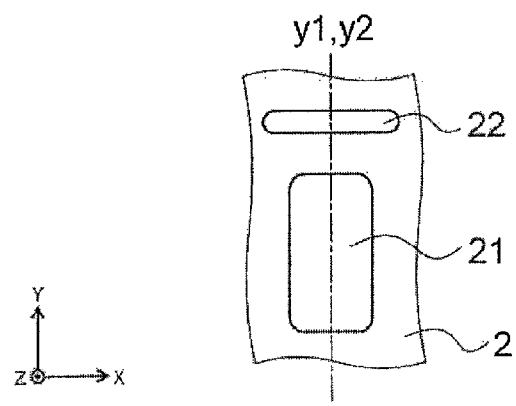

In examples illustrated in FIGS. 3A to 3C, a center axis y1 of the control pattern 21 parallel to the Y axis coincides with a center axis y2 of the regulation pattern 22 parallel to the Y axis. Among them, FIG. 3A illustrates an example in which a length of the regulation pattern 22 in a direction parallel to the X axis is substantially equal to a length of the control pattern 21 in a direction parallel to the X axis. By the way, in the present embodiment, "substantially" means allowing an error on manufacture. FIG. 3B illustrates an example in which a length of the regulation pattern 22 in the direction parallel to the X axis is shorter than a length of the control pattern 21 in the direction parallel to the X axis. FIG. 3C illustrates an example in which a length of the regulation pattern 22 in the direction parallel to the X axis is longer than a length of the control pattern 21 in the direction parallel to the X axis.

Figure 3D:
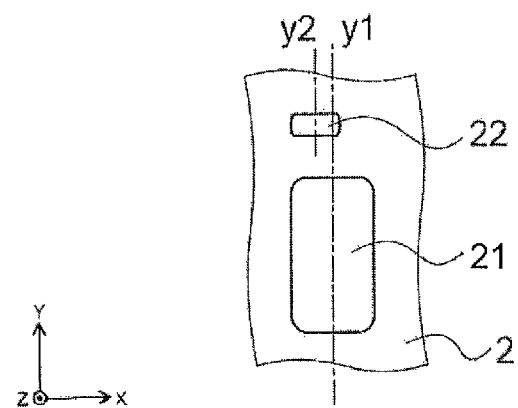

FIG. 3D illustrates an example in which the center axis y1 of the control pattern 21 does not coincide with the center axis y2 of the regulation pattern 22. In other words, in this example, the center axis y2 of the regulation pattern 22 is disposed with an offset from the center axis y1 of the control pattern 21.

In any example, the size and position of the regulation pattern 22 are selected suitably depending upon the magnetic field distribution around the control pattern 21. By the way, in the case where the regulation patterns 22 are provided on both the first edge portion 251 side and the second edge portion 252 side of the control pattern 21, center axes of regulation patterns 22 on both sides parallel to the Y axis may coincide with each other or may not coincide with each other.

(Another Modification of First Embodiment)

Figure 4A:
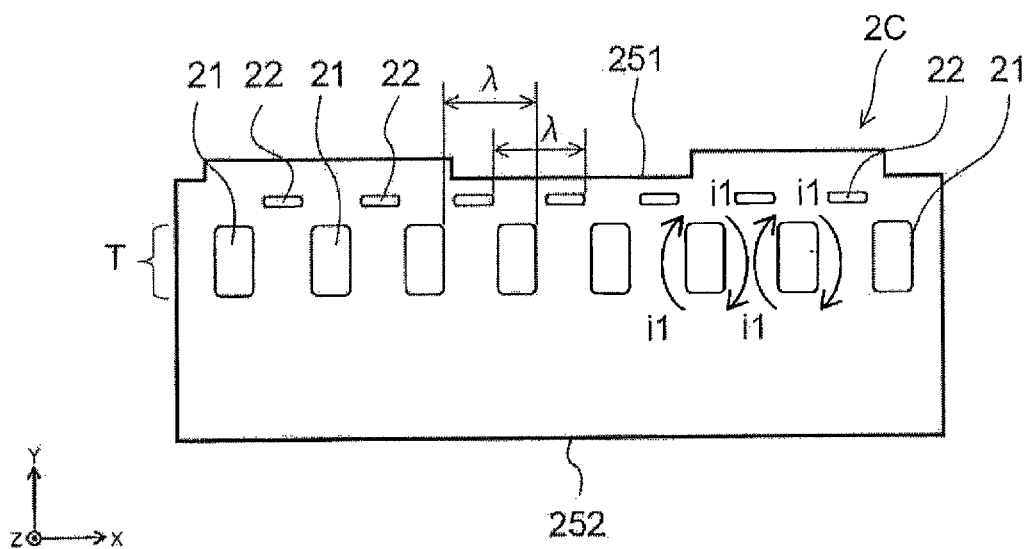
FIGS. 4A and 4B are schematic plane views exemplifying a scale applied to another modification of the embodiment.
Figure 4B:
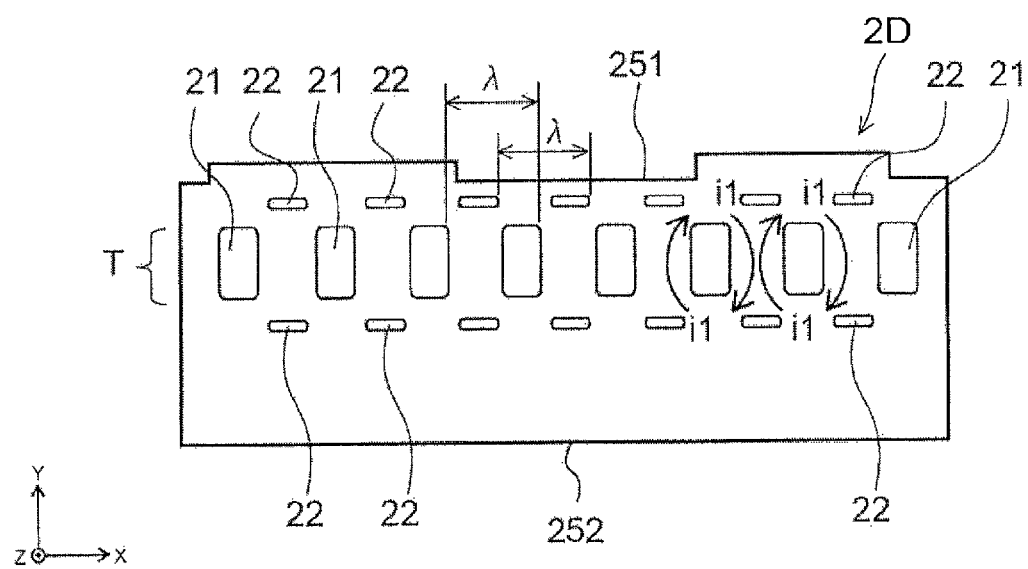

FIGS. 4A and 4B are schematic plane views exemplifying a scale applied to another modification of the present embodiment.

In a scale 2C illustrated in FIG. 4A, the regulation patterns 22 are provided between the track T and the first edge portion 251. In a scale 2D illustrated in FIG. 4B, the regulation patterns 22 are provided both between the track T and the first edge portion 251 and between the track T and the second edge portion 252. In both the scale 2C and the scale 2D, the control patterns 21 and the regulation patterns 22 do not overlap when viewed in a direction parallel to the Y axis.

In the scale 2C, the regulation patterns 22 are provided between the track T and the first edge portion 251 in this way. Even if there is a non-uniform portion such as a concave shape or a convex shape on an end face on the first edge portion 251 side, the route of the induced current i1 becomes less influenced by the shape of the first edge portion 251 side, because the route of the induced current i1 is intercepted by the regulation pattern 22.

Furthermore, even in a case where the shape of the control pattern 21 on the first edge portion 251 side is different from the shape of the control pattern 21 on the second edge portion 252 side, a difference in route between induced currents i1 flowing around the control pattern 21 is suppressed in the scale 2D. As a result, magnetic field distribution generated by the control pattern 21 is made uniform between the first edge portion 251 side and the second edge portion 252 side, and consequently precision of detection of the induced current i1 conducted by the sensor 1 is improved.

Figure 5A:
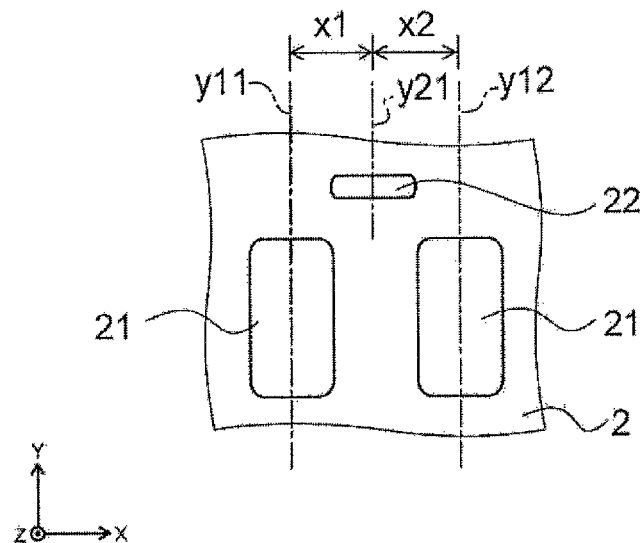
FIGS. 5A and 5B are schematic plane views exemplifying a shape and a position of a regulation pattern.
Figure 5B:
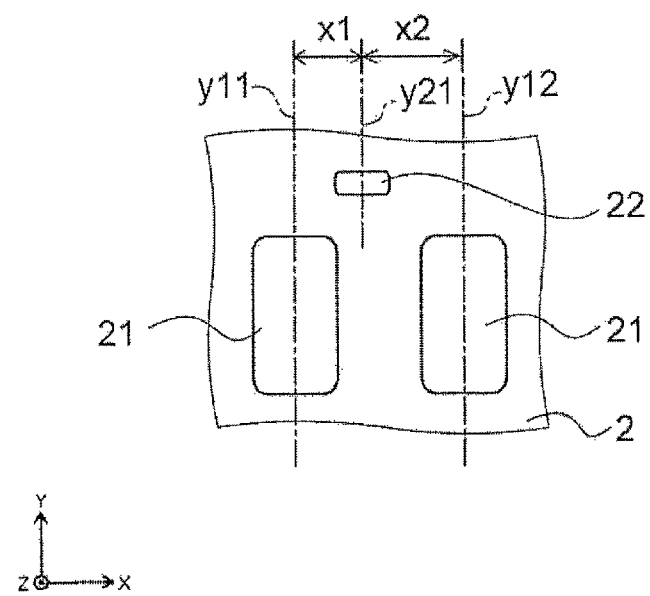

FIGS. 5A and 5B are schematic plane views exemplifying the shape and position of the regulation patterns 22. FIG. 5A illustrates an example in which the regulation pattern 22 is provided in a center position of two adjacent control patterns 21 in a direction parallel to the X axis. In other words, denoting center axes of the two adjacent control patterns 21 parallel to the Y axis by y11 and y12 and denoting a center axis of the regulation pattern 22 parallel to the Y axis by y21, a distance x1 between the center axis y11 and the center axis y21 in a direction parallel to the X axis is substantially equal to a distance x2 between the center axis y12 and the center axis y21.

FIG. 5B illustrates an example in which the regulation pattern 22 is provided to be biased to either one of two adjacent control patterns 21. In the example illustrated in FIG. 5B, a distance x1 between the center axis y11 and the center axis y21 in a direction parallel to the X axis is shorter than a distance x2 between the center axis y12 and the center axis y21. In both examples, selection is conducted suitably depending upon magnetic field distribution around the control pattern 21.

(Second Embodiment)

A second embodiment will now be described.

The second embodiment is an example of an absolute form induction type position measuring apparatus which measures an absolute position of the sensor 1 relative to the measurement reference line ML.

Figure 6:
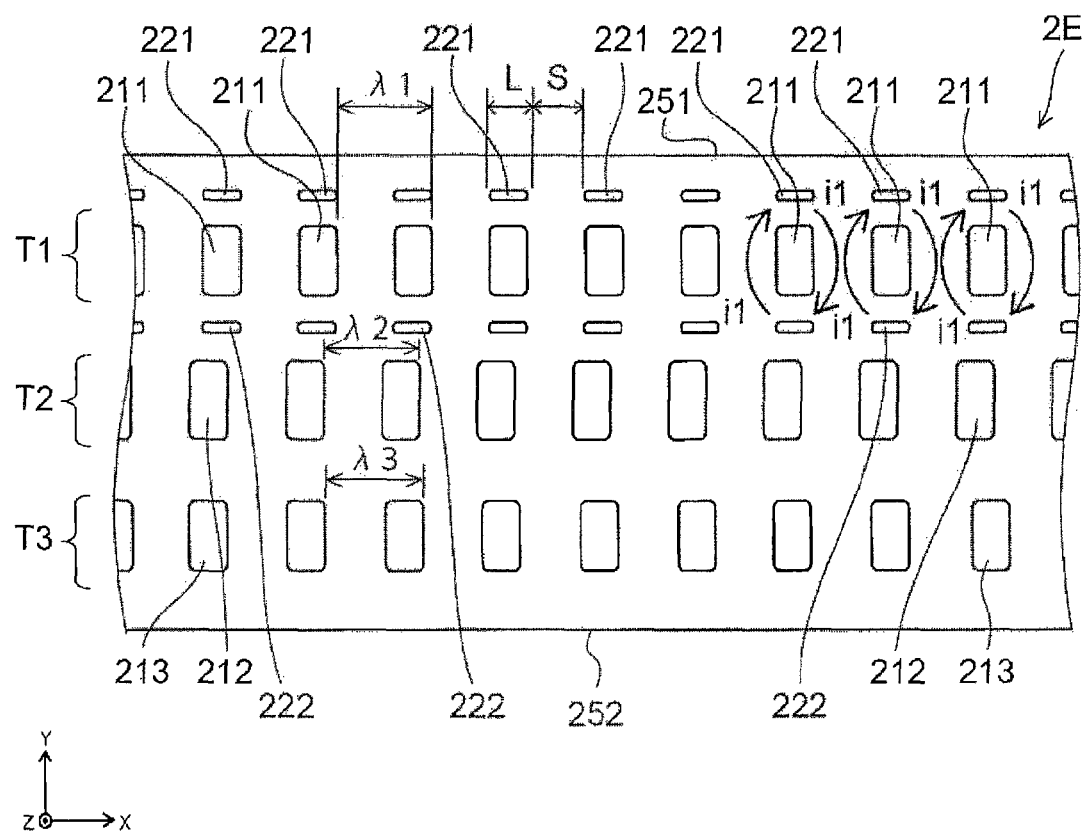
FIG. 6 is a schematic plane view exemplifying a scale applied to a second embodiment.

FIG. 6 is a schematic plane view exemplifying a scale applied to the second embodiment.

In a scale 2E illustrated in FIG. 6, a plurality of tracks T1 to T3 are provided in parallel. It is possible to combine the results of detection of induced currents conducted using the plurality of tracks T1 to T3 and measure an absolute position of the sensor 1 relative to the measurement reference line ML, by using the scale 2E. By the way, the track T1 is a track that exerts greater influence on resolution of position detection as compared with other tracks T2 and T3.

In the scale 2E, a plurality of control patterns 211 are provided on the track T1 in a direction parallel to the X axis with a period $\lambda 1$. A plurality of control patterns 212 are provided on the track T2 in the direction parallel to the X axis with a period $\lambda 2$. A plurality of control patterns 213 are provided on the track T3 in the direction parallel to the X axis with a period $\lambda 3$. The periods $\lambda 1$, $\lambda 2$, and $\lambda 3$ are different from each other.

In the scale 2E, regulation patterns 221 are provided between the track T1 which is the nearest the first edge portion 251 and the first edge portion 251. It is desirable that the regulation patterns 221 are provided respectively between the plurality of control patterns 211 and the first edge portion 251. In addition, it is desirable that the plurality of regulation patterns 221 are provided in a direction parallel to the X axis with the same period λ as the period λ1 of the plurality of control patterns 211.

Furthermore, in the scale 2E, regulation patterns (intermediate regulation patterns) 222 are provided. The regulation patterns 222 are provided between the track T1 and the track T2. In other words, the regulation patterns 222 are provided in an opposite position of the control patterns 211 on the track T1 in a direction parallel to the Y axis from the regulation patterns 221.

It is desirable that the regulation patterns 222 are provided respectively between the plurality of control patterns 211 and the track T2. In addition, it is desirable that the plurality of regulation patterns 222 are provided in a direction parallel to the X axis with the same period as the period λ of the plurality of control patterns 211 in the same way as the regulation patterns 221.

Furthermore, it is desirable that in a direction parallel to the Y axis, a space between the control patterns 211 and the regulation patterns 221 is substantially equal to a space between the control patterns 211 and the regulation patterns 222.

In the scale 2E, the regulation patterns 221 and 222 are provided on both sides of the control patterns 211 in a direction parallel to the Y axis. As a result, the induced current i1 becomes less influenced by the shape on the first edge portion 251 side and the adjacent track T2, and uniformalizing of the induced current i1 is achieved.

Specifically, even if there is a non-uniform portion such as a concave shape or a convex shape on an end face on the first edge portion 251, the route of the induced current i1 becomes less influenced by the shape of the first edge portion 251 side, because the route of the induced current i1 is intercepted by the regulation pattern 221.

In addition, owing to the regulation patterns 222 provided between the track T1 and the track T2, it is possible to suppress the induced current i1 flowing around the control pattern 211 on the track T1 from leaking out to the adjacent track T2. As a result, magnetic field distribution generated by each of the plurality of control patterns 211 is made uniform, and precision of detection of the induced current i1 conducted by the sensor 1 is improved.

As for a ratio of a length L of the regulation pattern 221 in the direction parallel to the X axis to a space S between two adjacent regulation patterns 221, the effect of intercepting the route of the induced current i1 becomes higher as the length L becomes longer. On the other hand, as the length L becomes longer, mechanical strength of the scale 2E becomes low. From a viewpoint of the effect of intercepting the route of the induced current i1 and the mechanical strength, therefore, the ratio of the length L to the space S is set suitably.

Figure 7:
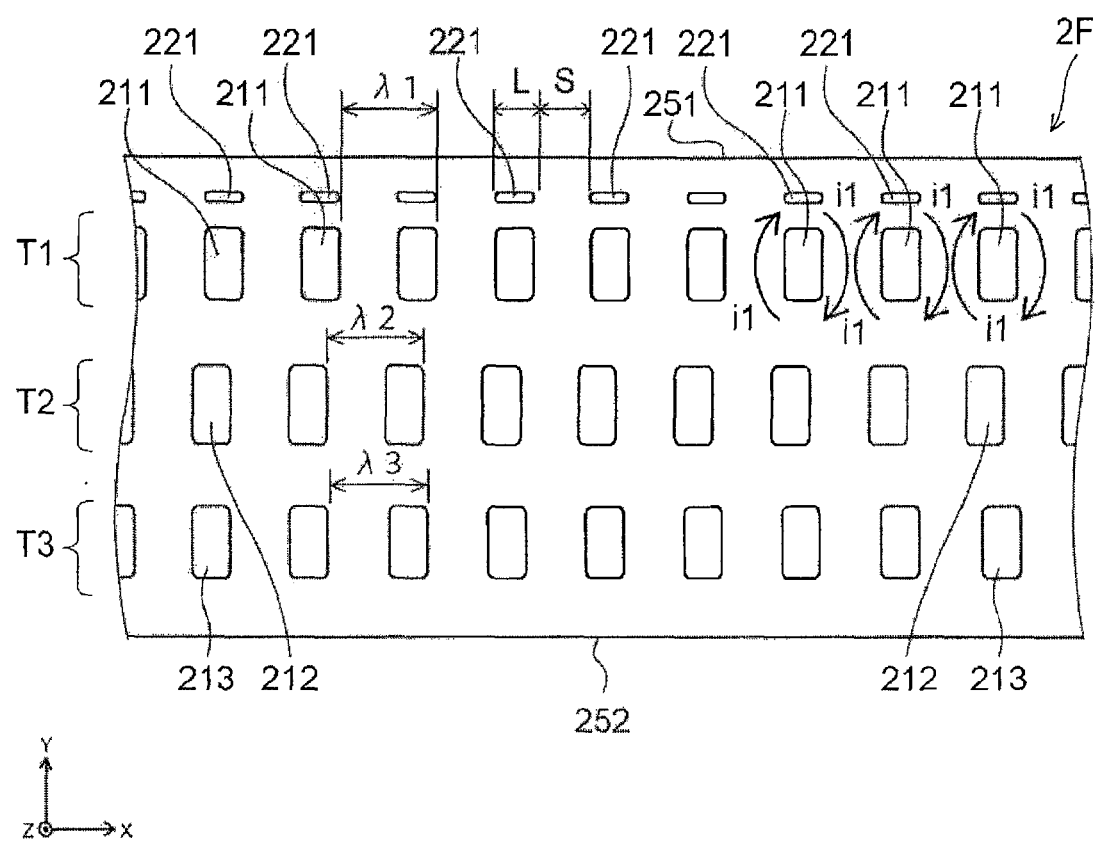
FIG. 7 is a schematic plane view illustrating a modification of a scale applied to the second embodiment.

FIG. 7 is a schematic plane view illustrating a modification of a scale applied to the second embodiment.

In the scale 2F illustrated in FIG. 7, the regulation patterns 221 are provided between the track T1 located nearest to the first edge portion 251 and the first edge portion 251. In the scale 2F, the regulation patterns (intermediate regulation patterns) 222 are not provided unlike the scale 2E illustrated in FIG. 6.

In the scale 2F, the regulation patterns 221 are provided between the track T1 and the first edge portion 251. Even if there is a non-uniform portion such as a concave shape or a convex shape on an end face on the first edge portion 251, the route of the induced current i1 becomes less influenced by the shape of the first edge portion 251 side, because the route of the induced current i1 is intercepted by the regulation pattern 221.

By the way, in the scale 2E illustrated in FIG. 6, an example in which the regulation patterns 221 and 222 are provided for the control patterns 211 on the track T1 has been described. However, similar regulation patterns 221 and 222 may be provided for the control patterns 212 and 213 respectively on other tracks T2 and T3. In this case, the regulation patterns 222 provided between two adjacent tracks may be used by both tracks. In the case where the regulation patterns 222 are used by both tracks, it is desirable that the period of the regulation patterns 222 is set in accordance with the period of control patterns on a track that exerts great influence upon the resolution of the position detection, or in accordance with the period of the period of control patterns on a track for which magnetic field distribution is desired to be made more uniform.

Furthermore, in the scales 2E and 2F respectively illustrated in FIGS. 6 and 7, the regulation patterns 221 and 222 may be provided on both sides of each of the control patterns 211, 212 and 213 respectively on all tracks T1 to T3.

Furthermore, in the scales 2E and 2F respectively illustrated in FIGS. 6 and 7, an example in which the control patterns 211 and the regulation patterns 221 and 222 overlap when viewed in a direction parallel to the Y axis has been described. As illustrated in FIGS. 4A and 4B, and FIGS. 5A and 5B, however, the control patterns 211 and the regulation patterns 221 and 222 may be made not to overlap when viewed in a direction parallel to the Y axis.

(Other Modifications)

Figure 8:
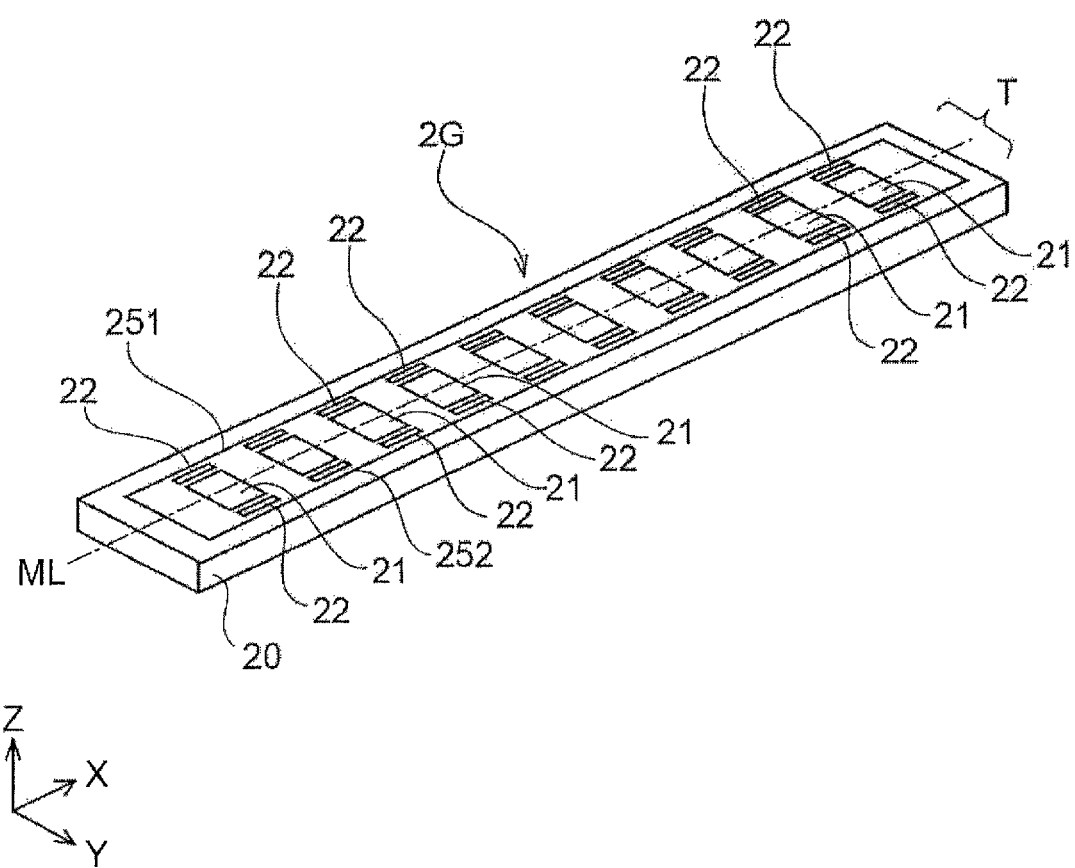
FIG. 8 is a schematic oblique view illustrating an example of another scale.

In the embodiments described above, tape-shaped scales worked by punching or etching a conductive plate material, as scale 2, 2A to 2F, have been exemplified. As illustrated in a schematic oblique view in FIG. 8, however, a scale 2G may be formed on a surface of an insulative substrate (for example, a glass substrate) 20. Control patterns 21 and regulation patterns 22 on the scale 2G are formed by covering the surface of the substrate 20 with a copper foil and then opening apertures by etching or the like.

Furthermore, in the embodiments described above, examples in which the control patterns 21 and the regulation patterns 22 are hole patterns have been mainly described. However, the control patterns 21 and the regulation patterns 22 may be other than hole patterns.

Figure 9A:
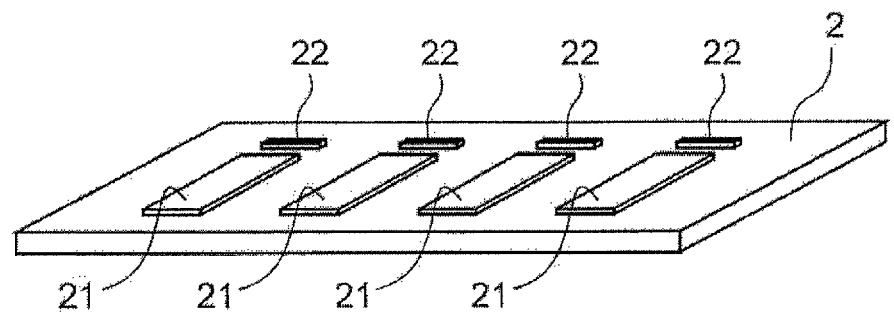
FIGS. 9A and 9B are schematic oblique views exemplifying another form of control patterns and regulation patterns.
Figure 9B:
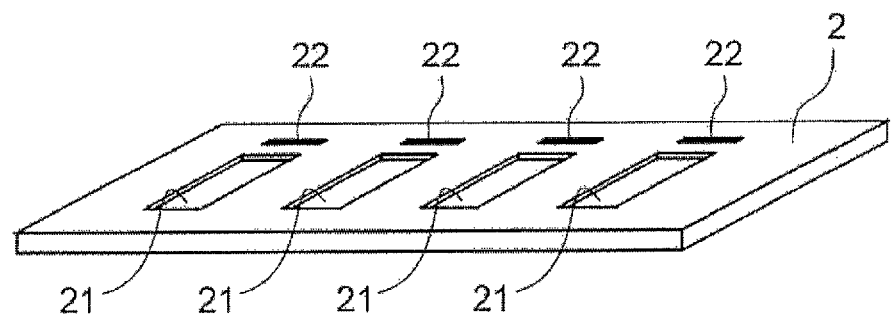
Figure 10A:
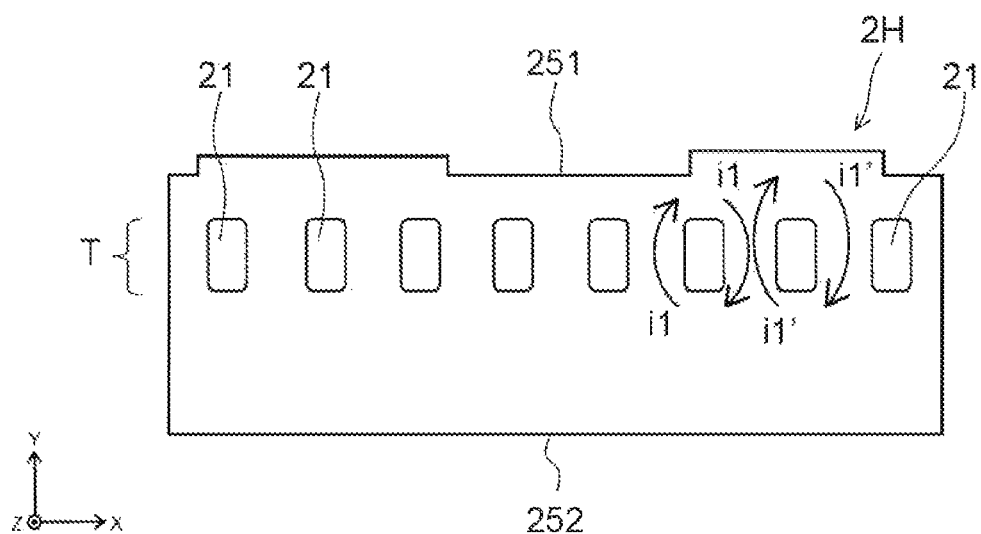
FIGS. 10A and 10B are schematic plane views exemplifying a conventional scale.
Figure 10B:
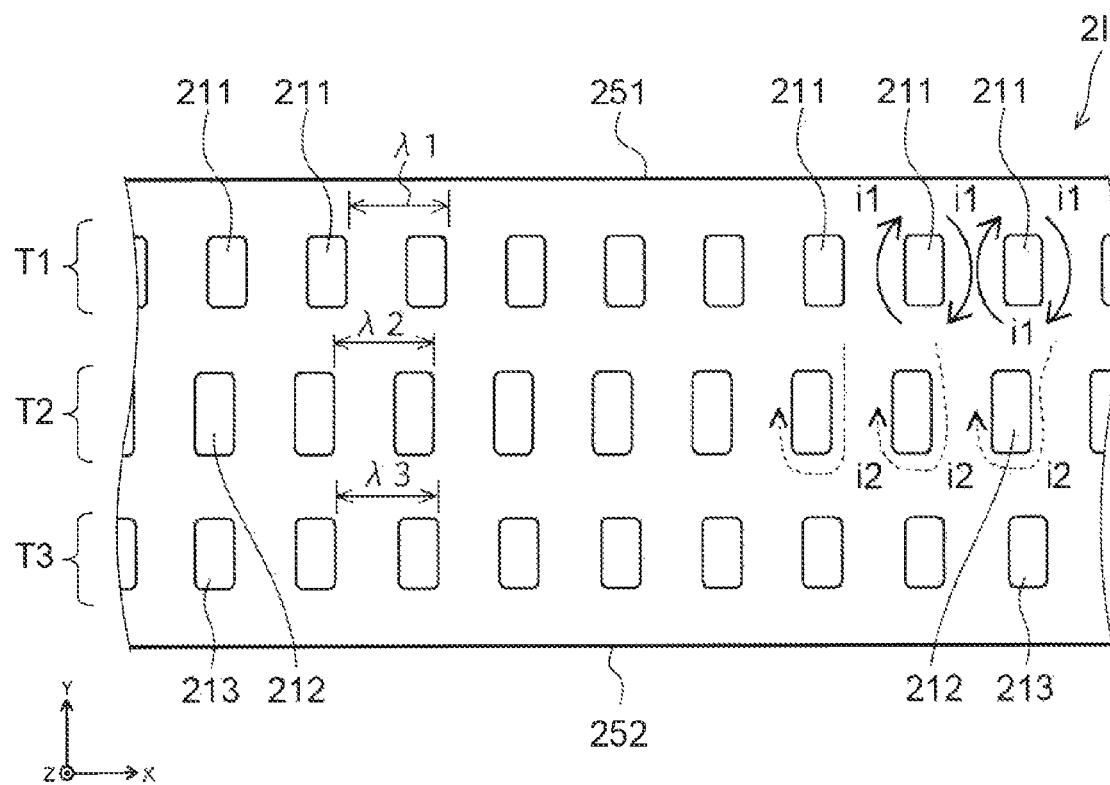

FIGS. 9A and 9B are schematic oblique views exemplifying another form of the control patterns and the regulation patterns.

The control patterns 21 and the regulation patterns 22 illustrated in FIG. 9A are formed to become convex from the material surface of a scale 2. The control patterns 21 and the regulation patterns 22 illustrated in FIG. 9B are formed to become concave from the material surface of the scale 2. In this way, it suffices that the control patterns 21 and the regulation patterns 22 are provided in the scale 2 to differ in resistance of the induced currents from other portions.

Furthermore, the shape of the control patterns 21 and the regulation patterns 22 when viewed in a direction parallel to the Z axis is not restricted to the illustrated shape, but a suitable shape such as a polygon, a circle, an ellipse, or an oblong shape may be taken besides a square or a rectangle shape.

Furthermore, in the above-described embodiments, an example in which the period of a plurality of regulation patterns 22 is made to coincide with the period of a plurality of control patterns 21 has been described. However, the periods may not coincide with each other.

In the induction type position measuring apparatus 100 according to the embodiments, a flow of an induced current on a scale with a periodic pattern formed becomes less influenced by an edge portion of the scale or an adjacent pattern, and it becomes possible to conduct position measurements with high precision.

Embodiments and various examples have been described. However, the present invention is not restricted to these examples. For example, in a case where those skilled in the art suitably conducts addition or deletion of components or a design change on the embodiments or various examples described above or suitably combines features of the embodiments or various examples, these results are incorporated in the scope of the present invention as long as the results do not depart from the spirit of the present invention.

INDUSTRIAL APPLICABILITY

The present invention can be utilized for rotary encoders besides for linear encoders. Furthermore, the present invention can be applied to encoders of both the absolute type and the increment type.

What is claimed is:

1. An induction type position measuring apparatus comprising:
    a scale including a track, a first edge portion and a second edge portion, the track including a plurality of control patterns provided on a conductive plate material or a conductive foil at equal intervals along a measurement reference line to control a flow of an induced current, the first edge portion, and the second edge portion being located on both sides of the measurement reference line; and
    a sensor provided to be capable of moving relatively to the scale along the measurement reference line to detect the induced current,
    the scale including regulation patterns provided on the conductive plate material or the conductive foil at least between the track and the first edge portion or between the track and the second edge portion to regulate the flow of the induced current.

2. The induction type position measuring apparatus according to claim 1, wherein the regulation patterns are provided both between the track and the first edge portion and between the track and the second edge portion.

3. The induction type position measuring apparatus according to claim 1, wherein a period of a plurality of the regulation patterns is equal to a period of the plurality of control patterns.

4. The induction type position measuring apparatus according to claim 2, wherein a period of a plurality of the regulation patterns is equal to a period of the plurality of control patterns.

5. The induction type position measuring apparatus according to claim 1, wherein
    the track comprises:
    a first track including a plurality of first control patterns provided with a first period along the measurement reference line; and
    a second track provided in parallel to the first track and including a plurality of second control patterns provided with a second period different from the first period along the measurement reference line, and
    the regulation patterns are provided at least between the first track and the first edge portion, between the first track and the second track, or between the second track and the second edge portion.

6. The induction type position measuring apparatus according to claim 5, wherein
    the induction type position measuring apparatus is an induction type position measuring apparatus of absolute form which finds an absolute position of the sensor relative to the measurement reference line on the basis of a detection result of the induced current on the first track and a detection result of the induced current on the second track,
    the regulation patterns include intermediate regulation patterns provided between the first track and the second track, and
    a period of a plurality of the intermediate regulation patterns is equal to a period of control patterns on the first track or the second track that exerts greater influence upon resolution of position detection.

7. The induction type position measuring apparatus according to claim 1, wherein
    the plurality of control patterns is in the conductive plate material or in the conductive foil; and
    the regulation patterns are in the conductive plate material or in the conductive foil.

8. The induction type position measuring apparatus according to claim 1, wherein
    the plurality of control patterns is in direct contact with the conductive plate material or with the conductive foil; and
    the regulation patterns are in direct contact with the conductive plate material or with the conductive foil.

* * * * *